F. MILLER.
TIRE PUNCTURE FINDER.
APPLICATION FILED JAN. 23, 1912.
1,037,954.
Patented Sept. 10, 1912.
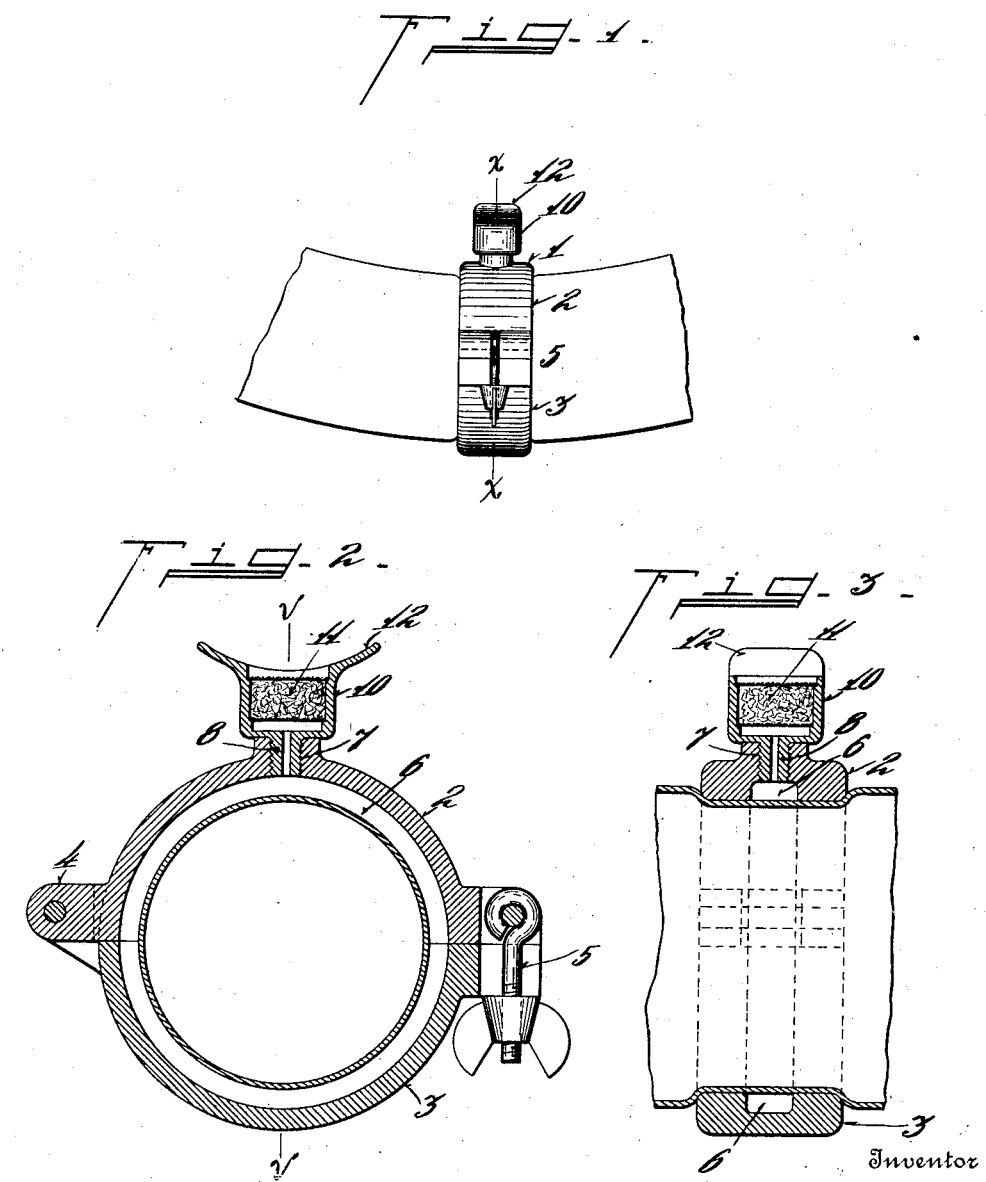

UNITED STATES PATENT OFFICE.

FRANCIS MILLER, OF BELLEVUE, KENTUCKY.

TIRE-PUNCTURE FINDER.

1,037,954.

Specification of Letters Patent.

Patented Sept. 10, 1912.

Application filed January 23, 1912. Serial No. 672,979.

*To all whom it may concern:*

Be it known that I, FRANCIS MILLER, a citizen of the United States, residing at Bellevue, in the county of Campbell and State of Kentucky, have invented certain new and useful Improvements in Tire-Puncture Finders, of which the following is a specification.

My invention relates to a device for detecting and locating leaks in pneumatic tubes such as vehicle tires, etc.

An object of this invention is to provide a simple, cheap, convenient and efficient device.

Another object of the invention is to provide a device which can detect leakage in a pneumatic tire, first by sliding it around the circumference of the tire to localize the leakage within a limited surface area of the tire in a radial plane, and which can then be slid around the localized tire area circumferentially to discover the exact point of leakage.

Another object of my invention is to provide the device with means for determining the valve leakage.

Another object of the invention is to provide the device with an instrumentality actuated by the escaping air for visually detecting and locating leaks.

The features of my invention will be more fully set forth in the description of the accompanying drawings, forming a part of this specification, in which:—

Figure 1 is a side elevation of the leak detector applied to a tire section. Fig. 2 is a section on line x, x, Fig. 1. Fig. 3 is a section on line v, v, Fig. 2.

The leak detector consists of the ring 1, formed of the ring sections 2, 3, appropriately of the diameter of the tire when lightly inflated, so as to be clamped around the tire to slightly compress the circumscribed tire section. Preferably the ring sections are provided with the hinged ends 4, the other ends having the clamp fastening 5. The ring thus formed has an internal annular groove 6, forming an air diameter, having the orifice 7, through one of the ring sections. Into this orifice is screw threaded the air outlet nipple 8, of the soap bubble blowers 10. In the blower is placed a porous water absorbent or bubble former 11, for carrying soapy water or its equivalent. Preferably, the walls of the blower are outwardly curved to form a concave seat 12, for engaging segments of the tire circumferentially in a given radial plane of the tire. Also, preferably, the nipple 8 is screw threaded to correspond with the screw threads of the air valve of the tire.

In operation, the blower being charged with soapy water, the ring is clamped around a tire as shown in Fig. 1. The ring is forced around the tire, describing a circle around the center. When an area of leakage is reached, the air will rush into chamber 6, escaping through nipple 8, passing through the bubble former 11 and projecting a soap bubble from the seat 12. Having localized the area of leakage, the ring should be moved first one way and then the other, until the bubbling ceases, two lines being marked on the tire defining the defective radial section of the tire. The ring is then removed and the seat 12 is applied to the defined section of leakage and slowly passed around said section circumferentially. Whenever a point of leakage is reached the air will escape in the reverse direction, projecting the bubble from the free end of the nipple 8, the nipple being preferably removed from the ring for this operation. When the nipple is screwed into the socket of the air valve, leakage from this source may be detected.

The device may be utilized in connection with any fluid tubes for detecting and locating leaks. Also, one size of ring may be used for different diameter tubes by varying the degree of inflation and the detector can be readily carried in a tool box.

Having described my invention, I claim:—

1. A leak detector and finder for pneumatic tubes, comprising a ring adapted to encircle the tire, and formed with an interior annular air chamber therein, a bubble blower on the ring communicating with said chamber, and a concave seat on the outer end of the blower for segmentally engaging the tube circumferentially.

2. A leak detector and finder for pneumatic tubes, comprising a ring adapted to encircle the tire, and formed with an interior annular air chamber therein, a bubble blower detachably secured on the ring, communicating with said chamber, and a concave seat on the outer end of the blower for segmentally engaging the tube circumferentially.

3. A leak detector and finder for pneumatic tubes comprising, a ring adapted to be clamped around the tube to encircle the same, and formed with an internal annular air chamber therein, and a bubble detector having a nipple screw threaded into the ring and communicating with said air chamber, the nipple threads being adapted to engage into the air valve of the tube.

4. A leak detector and finder for pneumatic tubes, comprising a ring having hinged components enabling the ring to encircle the tube, said ring being formed with an interior annular air chamber, means for securing together the meeting ends of said hinged components, and a bubble blower on one of said components communicating with said air chamber.

5. A leak detector and finder for pneumatic tubes, comprising a ring adapted to encircle the tube and formed with an interior annular air chamber, a bubble blower having a nipple adapted to be screwed into said ring to communicate with said air chamber, the mouth of said bubble blower having a concave surface adapted to engage the tire periphery, whereby when the leak area is discovered, the blower may be removed and its mouth placed against the tire and the bubble blown from the nipple end when the position of the leak is detected.

In testimony whereof, I have hereunto set my hand.

FRANCIS MILLER.

Witnesses:
OLIVER B. KAISER,
CLARENCE B. FOSTER.

Copies of this patent may be obtained for five cents each, by addressing the "Commissioner of Patents, Washington, D. C."